(12) United States Patent
Cox et al.

(10) Patent No.: US 8,796,554 B2
(45) Date of Patent: Aug. 5, 2014

(54) MOUNTING DEVICE AND METHOD OF ASSEMBLING THE SAME

(75) Inventors: Adam Benjamin Cox, Jacksonville, FL (US); William Ward Owens, Jacksonville, FL (US); Bruce D. Markert, Jacksonville, FL (US)

(73) Assignee: Unison Industries, LLC, Jacksonville, FL (US)

( * ) Notice: Subject to any disclaimer, the term of this patent is extended or adjusted under 35 U.S.C. 154(b) by 239 days.

(21) Appl. No.: 13/341,326

(22) Filed: Dec. 30, 2011

(65) Prior Publication Data

US 2013/0168129 A1 Jul. 4, 2013

(51) Int. Cl.
*H01B 17/00* (2006.01)
*B23P 11/00* (2006.01)

(52) U.S. Cl.
CPC .............. *H01B 17/00* (2013.01); *B23P 11/00* (2013.01)
USPC ............................................. 174/135; 29/428

(58) Field of Classification Search
CPC ........... H01B 17/00; B23P 11/00; F16L 3/00; H02G 3/26; H02G 11/00; H02G 3/32; H02G 3/30; B60R 16/0215; H01L 2224/32225
USPC ............................................. 174/135; 29/428
See application file for complete search history.

(56) References Cited

U.S. PATENT DOCUMENTS

| | | | |
|---|---|---|---|
| 4,750,265 A * | 6/1988 | Watanabe et al. | 29/854 |
| 6,248,952 B1 * | 6/2001 | Reeves et al. | 174/663 |
| 6,627,817 B1 * | 9/2003 | Kortenbach | 174/74 R |
| 7,966,832 B1 | 6/2011 | Lockyer et al. | |
| 8,056,346 B2 | 11/2011 | Lockyer et al. | |
| 2010/0258329 A1 | 10/2010 | Engelbach et al. | |
| 2011/0030377 A1 | 2/2011 | Lockyer et al. | |

OTHER PUBLICATIONS http://www.aircostcontrol.com/?q=202W302-12-0; 1 page, Jun. 27, 2012.

* cited by examiner

*Primary Examiner* — Timothy Thompson
*Assistant Examiner* — Charles Pizzuto
(74) *Attorney, Agent, or Firm* — William Scott Andes, Esq.; Armstrong Teasdale LLP

(57) ABSTRACT

A method of assembling a mounting device for an electrical harness of a gas turbine engine is provided. The electrical harness has a wire bundle. The method includes providing a first shell and providing a second shell. The method further includes coupling the first shell to the second shell with the wire bundle disposed between the first shell and the second shell such that movement of the first shell and the second shell along the wire bundle is restricted.

20 Claims, 4 Drawing Sheets

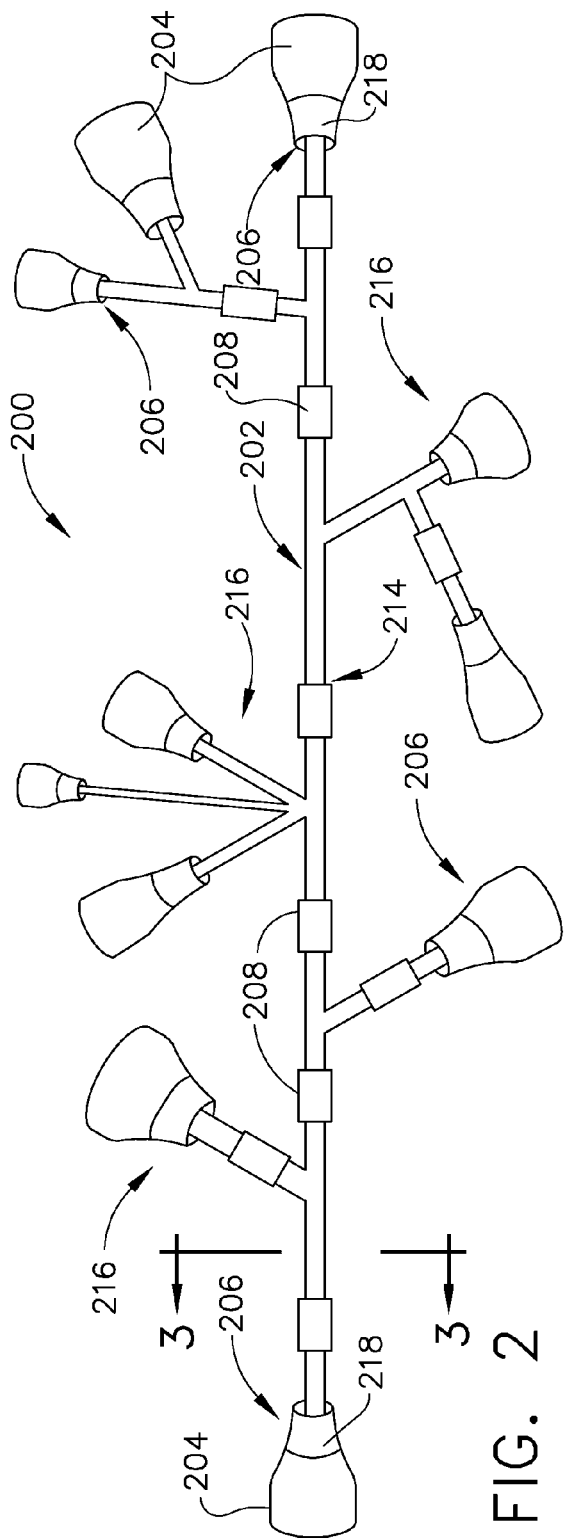
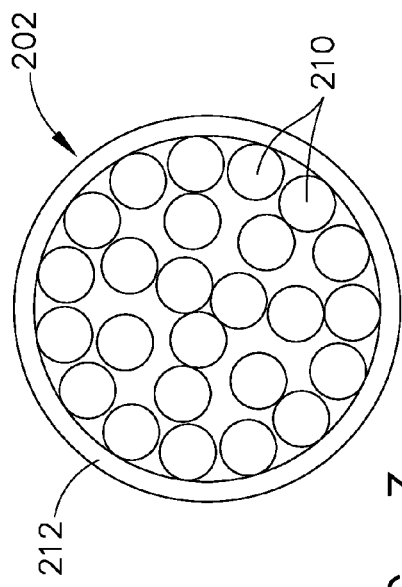

MOUNTING DEVICE AND METHOD OF ASSEMBLING THE SAME

BACKGROUND OF THE INVENTION

The field of this disclosure relates generally to mounting devices and, more particularly, to a mounting device for an electrical harness of a gas turbine engine.

Most known electro-mechanical systems (e.g., automobiles, aircraft, and watercraft) utilize wires as a medium for providing power or communication amongst their components. Because loose and unorganized wires can create a complex and unwieldy wire network throughout a system, similarly situated wires are often bundled together (e.g., in the form of an electrical harness) to facilitate more easily and properly securing the wires in the system, thereby helping to protect the wires from adverse affects (e.g., vibration, abrasion, moisture, heat, etc.) associated with system operation.

Many known electrical harnesses have an arrangement of mounting devices (e.g., locator grommets or bobbins) that facilitate mounting the harnesses within the associated systems. However, the configuration of wire breakouts and wire connectors of the harness has been known to influence the arrangement of mounting devices on the harness (e.g., the configuration of breakouts and wire connectors has been known to dictate mounting device locations along the harness). It would be useful, therefore, to provide a mounting device that can be arranged on a harness in a manner that is less influenced by the configuration of breakouts and connectors.

BRIEF DESCRIPTION OF THE INVENTION

In one aspect, a method of assembling a mounting device for an electrical harness of a gas turbine engine is provided. The electrical harness has a wire bundle. The method includes providing a first shell and providing a second shell. The method further includes coupling the first shell to the second shell with the wire bundle disposed between the first shell and the second shell such that movement of the first shell and the second shell along the wire bundle is restricted.

In another aspect, a mounting device for an electrical harness of a gas turbine engine is provided. The electrical harness has a wire bundle. The mounting device includes a first shell, a second shell, and at least one fastener configured to couple the first shell to the second shell with the wire bundle disposed between the first shell and the second shell such that movement of the first shell and the second shell along the wire bundle is restricted.

In another aspect, an electrical harness for a gas turbine engine is provided. The electrical harness includes a wire bundle having a covering and a plurality of wires disposed within the covering. The electrical harness also includes a mounting device coupled to the wire bundle, wherein the mounting device includes a first shell, a second shell, and at least one fastener configured to couple the first shell to the second shell with the wire bundle disposed between the first shell and the second shell such that movement of the first shell and the second shell along the wire bundle is restricted.

BRIEF DESCRIPTION OF THE DRAWINGS

FIG. 2 is a schematic illustration of an electrical harness of the gas turbine engine shown in FIG. 1;

FIG. 3 is a schematic cross-sectional illustration of the electrical harness shown in FIG. 2 and taken along line 3-3;

DETAILED DESCRIPTION OF THE INVENTION

The following detailed description sets forth a mounting device and a method of assembling the same by way of example and not by way of limitation. The description should clearly enable one of ordinary skill in the art to make and use the mounting device, and the description sets forth several embodiments, adaptations, variations, alternatives, and uses of the mounting device, including what is presently believed to be the best mode thereof. The mounting device is described herein as being applied to a preferred embodiment, namely an electrical harness for a gas turbine engine. However, it is contemplated that the mounting device and the method of assembling the same may have general application in a broad range of systems other than gas turbine engines (e.g., automobiles, watercraft, spacecraft, etc.) and/or a variety of commercial, industrial, and/or consumer applications other than electrical harnesses (e.g., to mount tubes, hoses, sensors having leads, or ignition leads).

Figure 1:
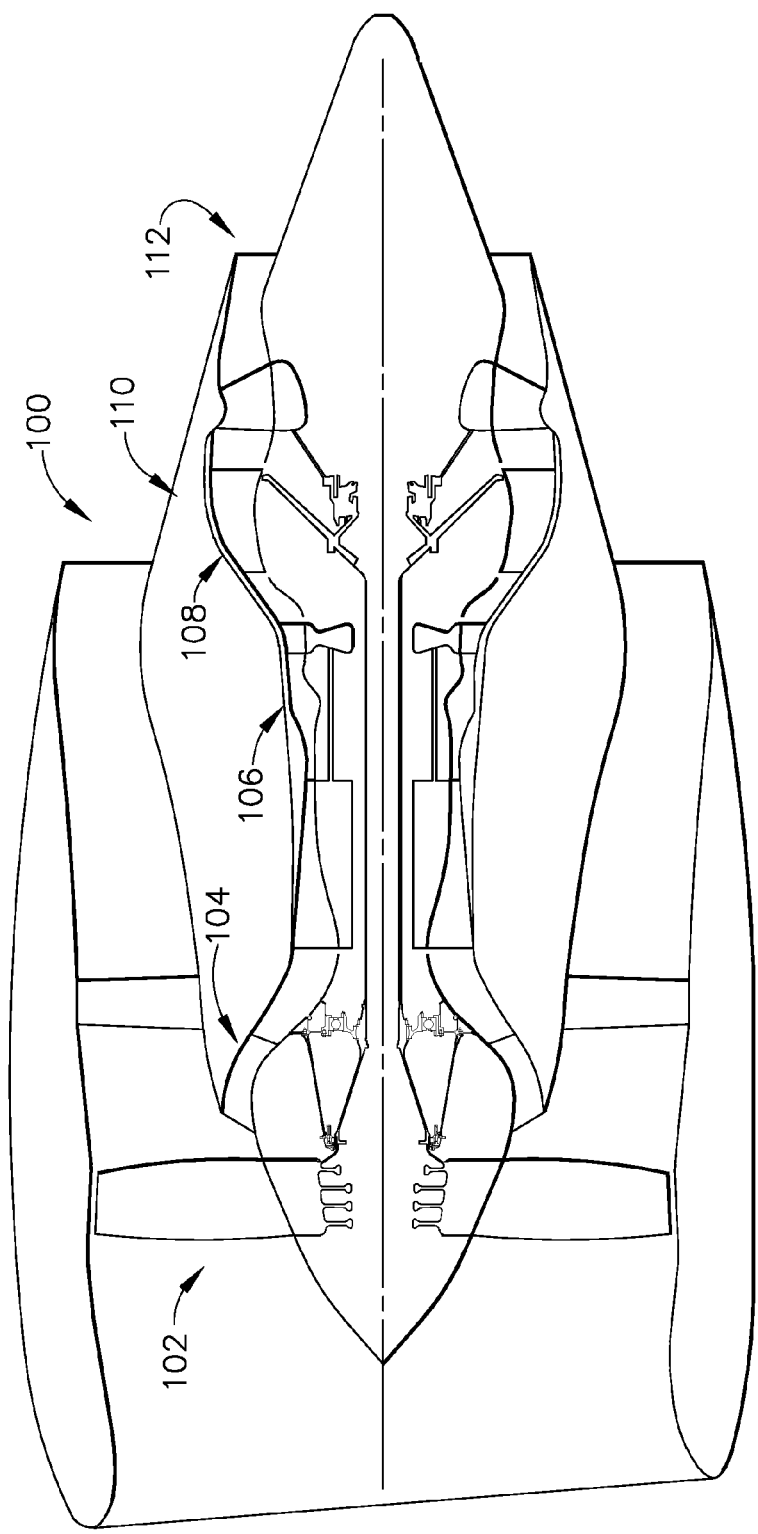
FIG. 1 is a schematic illustration of a gas turbine engine.

FIG. 1 is a schematic illustration of an exemplary gas turbine engine 100 including a fan system 102, a compressor system 104, a combustion system 106, a high pressure turbine system 108, and a low pressure turbine system 110. During operation, ambient air is directed through fan system 102 into compressor system 104, in which the ambient air is compressed and directed into combustion system 106. In combustion system 106, the compressed air is mixed with fuel and ignited to generate combustion gases that are directed through high pressure turbine system 108 and low pressure turbine system 110. The combustion gases are subsequently exhausted from gas turbine engine 100 via an exhaust system 112. In other embodiments, gas turbine engine 100 may include any suitable number of fan systems, compressor systems, combustion systems, and/or turbine systems configured in any suitable manner.

FIG. 2 is a schematic illustration of an electrical harness 200 for use on gas turbine engine 100, and FIG. 3 is a schematic cross-sectional illustration of electrical harness 200 taken along line 3-3. In the exemplary embodiment, electrical harness 200 includes a wire bundle 202, a plurality of connector assemblies 204 coupled at ends 206 of wire bundle 202, and a plurality of mounting devices 208 coupled at intermediate locations along wire bundle 202 between ends 206. Wire bundle 202 includes a plurality of wires 210 that, in some instances, are disposed within a covering 212 (e.g., at least one layer of a braided material) to facilitate protecting wires 210 from chaffing and/or electromagnetic interference (EMI). Wire bundle 202 has a main segment 214 and a plurality of breakout segments 216 extending from main segment 214, thereby enabling wires 210 to be more easily routed through gas turbine engine 100.

Each connector assembly 204 includes a housing (e.g., a cylindrical back shell 218) and a plurality of electrical pins (not shown) disposed therein such that the housing facilitates protecting and/or supporting an interface between wires 210 and the pins. In the exemplary embodiment, a cross-section of connector assembly 204 (e.g., a diameter of the housing) is larger than a cross-section of wire bundle 202 (e.g., a diameter of covering 212). In other embodiments, connector assembly 204 may have any suitable size and/or shape relative to wire bundle 202. As described in more detail below, mounting devices 208 are coupled to wire bundle 202 (e.g., atop of covering 212) to facilitate mounting electrical harness 200 at desired locations within gas turbine engine 100.

Figure 4:
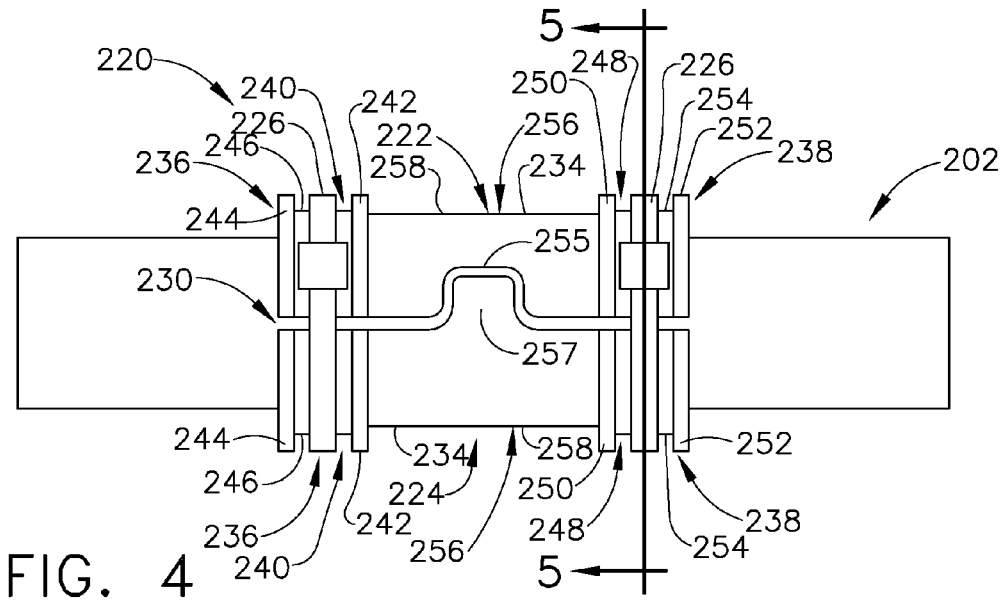
FIG. 4 is a schematic side illustration of a first embodiment of a mounting device of the electrical harness shown in FIG. 2.
Figure 5:
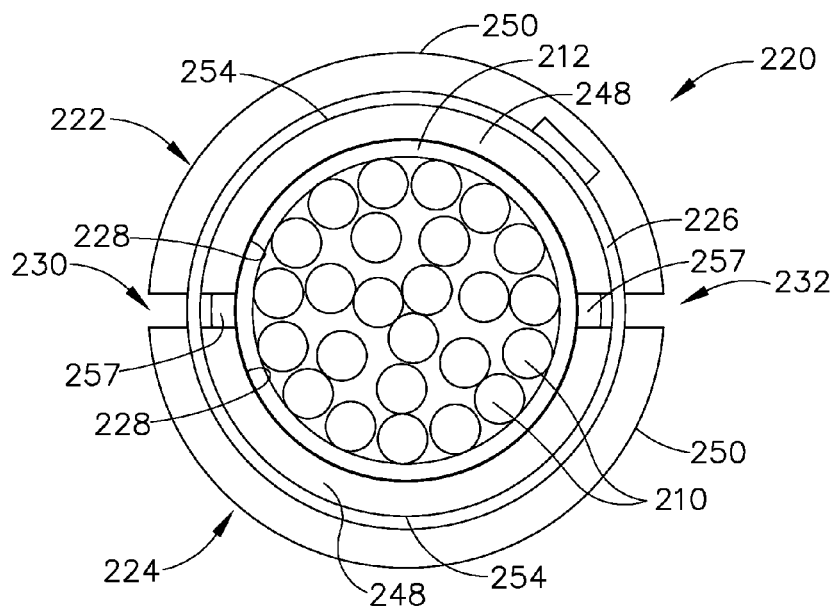
FIG. 5 is a schematic cross-sectional illustration of the mounting device shown in FIG. 4 and taken along line 5-5.

FIG. 4 is a schematic side illustration of a first embodiment of a mounting device 220 for use on electrical harness 200, and FIG. 5 is a schematic cross-sectional illustration of mounting device 220 taken along line 5-5. In the exemplary embodiment, mounting device 220 includes a first shell 222, a second shell 224, and at least one fastener 226 (e.g., a pair of annular band straps or a zip ties) coupling first shell 222 to second shell 224 about wire bundle 202, as described in more detail below.

In the exemplary embodiment, first shell 222 and second shell 224 are fabricated from a synthetic or semi-synthetic, organic-based material (e.g., a "plastic" material) rated to at least 200° C. (e.g., to at least 260° C. in one embodiment). The plastic material may be fabricated using any suitable manufacturing process such as, for example, an injection molding process, a compression molding process, and/or a machining process. In some embodiments, the plastic material may be a polyetheretherketone (PEEK) material or a polytetrafluoroethylene (PTFE) material. In the exemplary embodiment, fasteners 226 are fabricated from a metallic material (e.g., a stainless steel material). In other embodiments, first shell 222, second shell 224, and fasteners 226 may be fabricated from any suitable material (e.g., shells 222, 224 may be fabricated from a stainless steel material or other metallic material, and/or fasteners 226 may be fabricated from a PEEK material or other plastic material). If first shell 222 and second shell 224 are fabricated from a metallic material, first shell 222 and second shell 224 may be coupled together using a suitable bonding process (e.g., a welding process), rather than using mechanical fasteners 226 described above.

In the exemplary embodiment, first shell 222 and second shell 224 are generally semi-cylindrically shaped (i.e., first shell 222 and second shell 224 have inner surfaces 228 that are generally arcuate in cross-section) such that, when coupled together, first shell 222 and second shell 224 form a generally cylindrical shape that is sized to receive wire bundle 202. In another embodiment, inner surfaces 228 may have contours that vary along wire bundle 202 to facilitate an improved grip of first shell 222 and second shell 224 on wire bundle 202 (e.g., inner surfaces 228 may have at least one protuberance, such as an arcuately extending ridge, that facilitates gripping wire bundle 202). In other embodiments, first and second shells 222, 224 may be any suitable size and/or shape (e.g., may have inner surfaces 228 that are polygonal in cross-section). In the exemplary embodiment, first shell 222 and second shell 224 are sized such that gaps 230, 232 are defined between first shell 222 and second shell 224 on opposite sides of wire bundle 202 when first shell 222 and second shell 224 are seated against wire bundle 202, thereby enabling first shell 222 and second shell 224 to be displaced toward one another in order to compress wire bundle 202 as described in more detail below. Alternatively, mounting device 220 may have any suitable number of shells configured to be coupled together to form any suitable number of gaps arranged in any suitable manner about wire bundle 202.

In the exemplary embodiment, each of first shell 222 and second shell 224 has an outer surface 234 that is segmented into a first end region 236, a second end region 238, and a middle region 256. Each first end region 236 includes a first shoulder 240 having inner and outer first ribs 242, 244 that are spaced apart to define a first fastener seat 246 therebetween. Similarly, each second end region 238 includes a second shoulder 248 having inner and outer second ribs 250, 252 that are spaced apart to define a second fastener seat 254 therebetween. Extending from first end region 236 to second end region 238 is middle region 256, which defines a mounting seat 258 that is closer (e.g., radially closer) to wire bundle 202 than first fastener seat 246 and second fastener seat 254 (e.g., shoulders 240, 248 are raised relative to middle region 256 such that first fastener seat 246 and second fastener seat 254 are elevated relative to mounting seat 258). In some embodiments, first and second end regions 236, 238 may not include shoulders 240, 248 (e.g., first ribs 242, 244 and second ribs 250, 252 may still define first and second fastener seats 246, 254, respectively, but first and second fastener seats 246, 254 may have the same elevation as mounting seat 258). In other embodiments, first shell 222 and second shell 224 may not include outer first rib 244 and outer second rib 252 (i.e., inner first rib 242 and inner second rib 250 still segment outer surface 234 of shells 222, 224 into end regions 236, 238 and middle region 256). Alternatively, first shell 222 and second shell 224 may not have any ribs 242, 244, 250, 252 such that outer surface 234 is not segmented into regions.

In the exemplary embodiment, one of first shell 222 and second shell 224 has a tab receiving space 255, and the other of first shell 222 and second shell 224 has a corresponding tab 257 configured for insertion into tab receiving space 255 when first shell 222 and second shell 224 are coupled together about wire bundle 202 as described in more detail below. Tab receiving space 255 and tab 257 interface with one another in a manner that facilitates restricting displacement of first shell 222 and second shell 224 relative to one another when coupled together about wire bundle 202. In one embodiment, one tab receiving space 255 and one corresponding tab 257 are located on opposing sides of mounting device 220. Alternatively, mounting device 220 may have any suitable number of tab receiving spaces 255 and corresponding tabs 257 that facilitate enabling mounting device 220 to function as described herein.

To couple mounting device 220 to wire bundle 202, first and second shells 222, 224 are seated against wire bundle 202 to define gaps 230, 232, and tabs 257 are inserted into tab receiving spaces 255. Fasteners 226 are then coupled relatively loosely about first and second shells 222, 224 on fastener seats 246, 254 (e.g., first shell 222 and second shell 224 are maintained in contact with wire bundle 202 but are slideable together along wire bundle 202). Fasteners 226 are then tightened such that first shell 222 and second shell 224 are displaced toward one another, thereby reducing gaps 230, 232 such that first shell 222 and second shell 224 are no longer slideable along wire bundle 202 (e.g., first shell 222 and second shell 224 are displaced toward one another in order to compress wire bundle 202 such that the compression forces restrict movement of first shell 222 and second shell 224 along wire bundle 202). Because fasteners 226 are seated on fastener seats 246, 254 between first ribs 242, 244 and second ribs 250, 252, respectively, fasteners 226 are restricted from moving along wire bundle 202 relative to first shell 222 and second shell 224. Tabs 257 disposed within tab receiving spaces 255 facilitate restricting displacement of shells 222, 224 relative to one another along wire bundle 202. It should also be noted that for all embodiments described herein, while first shell 222 and second shell 224 are described as being configured for coupling to wire bundle 202 using mechanical fasteners 226, an adhesive disposed between shells 222, 224 and wire bundle 202 may be used in lieu of, or in addition to, fasteners 226 to facilitate securing shells 222, 224 to wire bundle 202.

After mounting device 220 is coupled to wire bundle 202 in the manner described above, mounting device 220 may be coupled to gas turbine engine 100 by being engaged within a fastening mechanism (e.g., a broom clip, clam shell clip, or p-clamp) that is fixed to a suitable surface of gas turbine engine 100 (e.g., a casing of gas turbine engine 100) such that the fastening mechanism of gas turbine engine 100 is seated against mounting seat 258 between inner first and second ribs 242, 250. Because the fastening mechanism is coupled to mounting device 220 between inner first and second ribs 242, 250, mounting device 220 is restricted from moving relative to the fastening mechanism, thereby fixing electrical harness 200 at desired location(s) on gas turbine engine 100 during operation. In some embodiments, a plurality of mounting devices 220 may be provided in a kit. Each mounting device 220 in the kit may have substantially the same outer surface contour (e.g., outer diameter) for mounting seat 258, while each mounting device 220 in the kit may have a different inner surface contour (e.g., inner diameter) for inner surfaces 228. This would minimize variation amongst the fastening mechanisms (e.g., broom clips) of gas turbine engine 100 while allowing for variation in the diameter of wire bundle 202, thereby resulting in more uniformity and reduced costs associated with the fastening mechanisms of gas turbine engine 100.

In the event that replacement, repair, or relocation of electrical harness 200 is desired, each mounting device 220 may simply be detached from its associated fastening mechanism of gas turbine engine 100, and its fasteners 226 may simply be removed from first shell 222 and second shell 224 to enable detachment of first shell 222 and second shell 224 from wire bundle 202. In this manner, first and second shells 222, 224 do not need to be discarded upon removal from wire bundle 202 and may subsequently be reattached to a new, repaired, or relocated wire bundle 202 in the same manner as described above (e.g., either using the previous fastener(s) 226 or new fastener(s) 226 depending, at least in part, upon the condition of the previous fasteners 226 and/or the method by which the previous fasteners 226 were removed from first shell 222 and second shell 224). Similarly, first shell 222 and/or second shell 224 may be replaced or repaired as desired. As such, mounting devices 220 are more easily coupled to and uncoupled from wire bundle 202 such that mounting devices 220 are more easily removed and/or repaired, replaced, or relocated in the field. Additionally, mounting device 220 is configured to be coupled to wire bundle 202 at desired mounting locations of wire bundle 202 without having to slide mounting device 220 over connector assemblies 204 and/or breakout segments 216, thereby providing easier coupling of mounting devices 220 to wire bundle 202 at desired mounting locations for electrical harness 200. Thus, mounting device 220 does not need to be thermally expanded or shrunk in order to be coupled to wire bundle 202, which enables mounting device 220 to be fabricated from more rigid and resilient materials (e.g., higher temperature rated materials).

Figure 6:
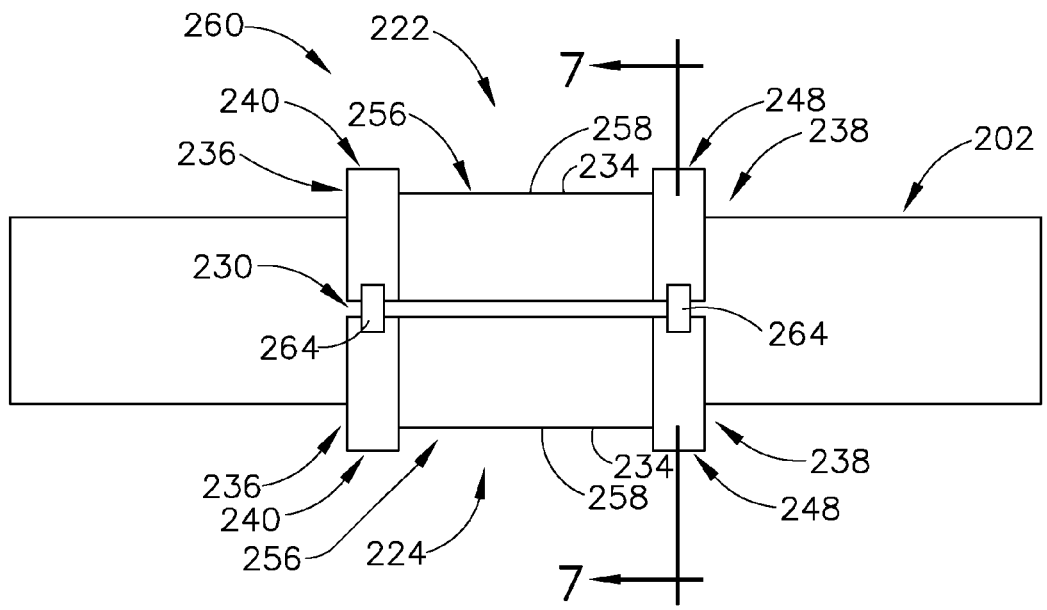
FIG. 6 is a schematic side illustration of a second embodiment of a mounting device of the electrical harness shown in FIG. 2.
Figure 7:
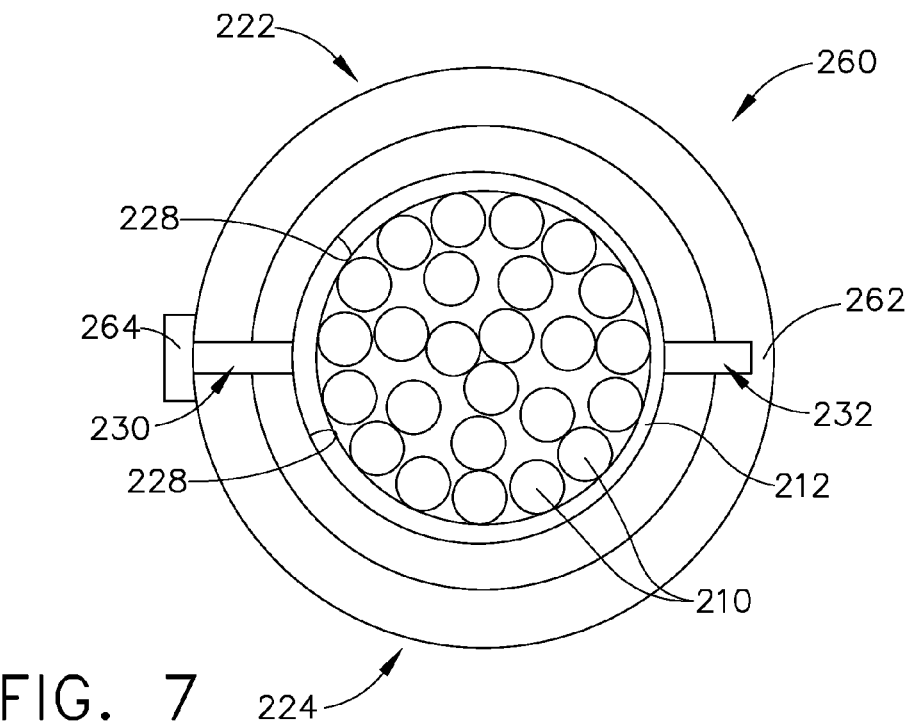
FIG. 7 is a schematic cross-sectional illustration of the mounting device shown in FIG. 6 and taken along line 7-7.

FIG. 6 is a schematic side illustration of a second embodiment of a mounting device 260, and FIG. 7 is a schematic cross-sectional illustration of mounting device 260 taken along line 7-7. Mounting device 260 is similar to mounting device 220 of FIGS. 4 and 5, and like components are indicated using the same reference numerals used in FIGS. 4 and 5. In the exemplary embodiment, mounting device 260 includes first shell 222 (without ribs 242, 244), second shell 224 (without ribs 250, 252), a hinge 262 coupling first shell 222 to second shell 224 at gap 232, and a plurality of fasteners 264 (e.g., snaps) for detachably coupling first shell 222 to second shell 224 at gap 230 in a clam-shell configuration such that mounting device 260 may be coupled to wire bundle 202 as described below. First shell 222 and second shell 224 may be suitably fabricated from the same materials described above. Similarly, hinge 262 and fasteners 264 may be fabricated from any of the plastic or metallic materials described herein.

In the exemplary embodiment, hinge 262 is formed integrally with first shell 222 and second shell 224. In other embodiments, hinge 262 may be formed separately from, and coupled to, first shell 222 and second shell 224 in any suitable manner. In the exemplary embodiment, fasteners 264 are formed separately from, and coupled to, first shell 222 and second shell 224. In other embodiments, fasteners 264 may be formed integrally with first shell 222 and/or second shell 224. While fasteners 264 are disposed on shoulders 240, 248 in the exemplary embodiment, fasteners 264 may have any suitable location along gap 230 (e.g., in middle region 256). Alternatively, mounting device 260 may have any suitable arrangement of hinge(s) and fastener(s) that facilitates enabling mounting device 260 to function as described herein.

To couple mounting device 260 to wire bundle 202, first shell 222 and second shell 224 are detached from one another at gap 230 via fasteners 264 and are opened relative to one another via hinge 262, thereby enabling wire bundle 202 to be inserted between first shell 222 and second shell 224. With wire bundle 202 disposed between first shell 222 and second shell 224, first shell 222 and second shell 224 are coupled together via fasteners 264. In some embodiments, a bonding material (e.g., an adhesive or a tape) may be disposed between wire bundle 202 and inner surfaces 228 of first shell 222 and/or second shell 224 to facilitate bonding mounting device 260 to wire bundle 202, thereby further restricting movement of mounting device 260 along wire bundle 202. After mounting device 260 is coupled to wire bundle 202, mounting device 260 may be engaged within a fastening mechanism of gas turbine engine 100 in a manner similar to that of mounting device 220 described above.

The methods and systems described herein facilitate providing a mounting device that can be arranged on an electrical harness in a manner that is less influenced by the configuration of breakout segments and connector assemblies of the electrical harness. The methods and systems described herein also facilitate providing a mounting device with restricted lateral movement along a wire bundle of an electrical harness. The methods and systems described herein further facilitate providing a mounting device that is more durable in higher temperature applications. The methods and systems described herein further facilitate providing an improved fit between an electrical harness and fastening system of the engine (e.g. a broom clip), and further facilitate a reduction in engine fastening system sizes needed to mount an electrical harness by compensating for harness bundle diameter variation while maintaining fastening system interface dimensioning. The methods and systems described herein further facilitate providing a more easily relocateable and replaceable mounting device for an electrical harness. The methods and systems described herein therefore facilitate reducing time and costs associated with manufacturing, installing, and maintaining mounting devices.

Exemplary embodiments of a mounting device and a method of assembling the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only electrical harnesses of gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method of assembling a mounting device for an electrical harness of a gas turbine engine, the electrical harness having a wire bundle, said method comprising:
   providing a first shell and a second shell, wherein each of the first shell and the second shell has a first end region, a second end region, and a middle region between the first end region and the second end region; and
   coupling the first shell to the second shell with the wire bundle disposed between the first shell and the second shell such that movement of the first shell and the second shell along the wire bundle is restricted, and such that the middle region defines a mounting seat that is closer to the wire bundle than the first end region and the second end region.

2. A method in accordance with claim 1, further comprising:
   providing each of the first shell and the second shell with a generally semi-cylindrical shape; and
   coupling the first shell to the second shell such that the first shell and the second shell form a generally cylindrical shape about the wire bundle.

3. A method in accordance with claim 1,
   wherein the first end region has a pair of spaced-apart first ribs and wherein the second end region has a pair of spaced-apart second ribs, said method further comprising:
   coupling the first shell to the second shell by tightening a first annular fastener disposed between the first ribs and a second annular fastener disposed between the second ribs.

4. A method in accordance with claim 1, further comprising providing the first shell and the second shell as being fabricated from a plastic material.

5. A method in accordance with claim 4, further comprising providing the first shell and the second shell as being fabricated from a polyetheretherketone (PEEK) material that is rated to at least 260° C.

6. A method in accordance with claim 4, further comprising fastening the first shell to the second shell via a fastener fabricated from a metallic material.

7. A mounting device for an electrical harness of a gas turbine engine, the electrical harness having a wire bundle, said mounting device comprising:
   a first shell and a second shell, wherein each of said first shell and said second shell comprises a first end region, a second end region, and a middle region between said first end region and said second end region, wherein said middle region defines a mounting seat that is configured to be closer to the wire bundle than said first end region and said second end region; and
   at least one fastener configured to couple said first shell to said second shell with the wire bundle disposed between said first shell and said second shell such that movement of said first shell and said second shell along the wire bundle is restricted.

8. A mounting device in accordance with claim 7, wherein each of said first shell and said second shell comprises a generally semi-cylindrical shape such that said first shell and said second shell form a generally cylindrical shape about the wire bundle when said first shell and said second shell are coupled together.

9. A mounting device in accordance with claim 7, wherein said first end region comprises a pair of spaced-apart first ribs and wherein said second end region comprises a pair of spaced-apart second ribs, said at least one fastener comprising a first annular fastener configured to be disposed between said first ribs and a second annular fastener configured to be disposed between said second ribs.

10. A mounting device in accordance with claim 7, wherein said first shell and said second shell are fabricated from a plastic material.

11. A mounting device in accordance with claim 10, wherein said plastic material is a polyetheretherketone (PEEK) material that is rated to at least 260° C.

12. A mounting device in accordance with claim 10, wherein said at least one fastener is fabricated from a metallic material.

13. An electrical harness for a gas turbine engine, said electrical harness comprising:
   a wire bundle comprising a covering and a plurality of wires disposed within said covering; and
   a mounting device coupled to said wire bundle, wherein said mounting device comprises:
     a first shell and a second shell, wherein each of said first shell and said second shell comprises a first end region, a second end region, and a middle region between said first end region and said second end region, wherein said middle region defines a mounting seat that is closer to the wire bundle than said first end region and said second end region; and
     at least one fastener configured to couple said first shell to said second shell with said wire bundle disposed between said first shell and said second shell such that movement of said first shell and said second shell along said wire bundle is restricted.

14. An electrical harness in accordance with claim 13, wherein each of said first shell and said second shell comprises a generally semi-cylindrical shape such that said first shell and said second shell form a generally cylindrical shape about said wire bundle when said first shell and said seconds shell are coupled together.

15. An electrical harness in accordance with claim 13, wherein said first end region comprises a pair of spaced-apart first ribs and wherein said second end region comprises a pair of spaced-apart second ribs, said at least one fastener comprising a first annular fastener configured to be disposed between said first ribs and a second annular fastener configured to be disposed between said second ribs.

16. An electrical harness in accordance with claim 13, wherein said first shell and said second shell are fabricated from a plastic material.

17. An electrical harness in accordance with claim 16, wherein said plastic material is a polyetheretherketone (PEEK) material that is rated to at least 260° C.

18. An electrical harness in accordance with claim 16, wherein said at least one fastener is fabricated from a metallic material.

19. An electrical harness in accordance with claim 13, wherein said wire bundle comprises an end, said electrical harness further comprising a connector assembly coupled to said wire bundle at said end.

20. An electrical harness in accordance with claim 19, wherein said wire bundle further comprises a main segment and a breakout segment, said breakout segment disposed between said mounting device and said connector assembly.

* * * * *